United States Patent
Welsh

[19]

[11] Patent Number: 5,978,103
[45] Date of Patent: Nov. 2, 1999

[54] APPARATUS AND METHOD FOR COMPUTERIZED ACQUISITION OF X-RAY IMAGES

[75] Inventor: C. Rex Welsh, Seattle, Wash.

[73] Assignee: CRW Imaging Inc., Bothell, Wash.

[21] Appl. No.: 08/858,391

[22] Filed: May 19, 1997

Related U.S. Application Data

[63] Continuation of application No. 08/497,231, Jun. 30, 1995, abandoned.

[51] Int. Cl.[6] .................................................... H04N 1/10
[52] U.S. Cl. ............................................ 358/487; 358/475
[58] Field of Search .................................... 358/487, 475; 348/110, 112

[56] References Cited

U.S. PATENT DOCUMENTS

| | | | |
|---|---|---|---|
| 4,035,067 | 7/1977 | Whatley et al. | 352/85 |
| 4,047,806 | 9/1977 | Puel | 350/236 |
| 4,159,175 | 6/1979 | Tabayashi | 355/77 |
| 4,387,985 | 6/1983 | Magin et al. | 355/71 |
| 4,651,226 | 3/1987 | Motoori et al. | 358/293 |
| 4,712,870 | 12/1987 | Robinson et al. | 350/243 |
| 4,757,374 | 7/1988 | Ramsay et al. | 355/40 |
| 4,943,689 | 7/1990 | Siefer et al. | 178/18 |
| 4,958,241 | 9/1990 | Ohtomo et al. | 358/487 |
| 5,028,744 | 7/1991 | Purcell et al. | 178/18 |
| 5,161,880 | 11/1992 | Azuma | 362/223 |
| 5,177,777 | 1/1993 | Niino | 378/99 |
| 5,276,534 | 1/1994 | Mutze et al. | 358/487 |
| 5,282,064 | 1/1994 | Yamada | 358/487 |
| 5,321,681 | 6/1994 | Ramsay et al. | 369/69 |
| 5,337,164 | 8/1994 | Yabe et al. | 358/487 |

*Primary Examiner*—Thomas D. Lee
*Assistant Examiner*—Stephen Brinich
*Attorney, Agent, or Firm*—Dennison, Meserole, Scheiner & Schultz

[57] ABSTRACT

There is described an apparatus and method for acquiring a video image from a film transparency, the apparatus having an optical axis O and a source of light for illuminating the transparency, comprising a first diffuser on the optical axis positioned adjacent the source of light, at least one fresnel lens positioned on the optical axis and having a focal length f, the fresnel lens being spaced from the first diffuser by a predetermined distance d where d<f, a second diffuser positioned on the optical axis adjacent the fresnel lens, a transparent plate for supporting the transparency on the optical axis and positioned adjacent the second diffuser, and a video recorder positioned on the optical axis for acquiring a video image of the transparency.

16 Claims, 2 Drawing Sheets

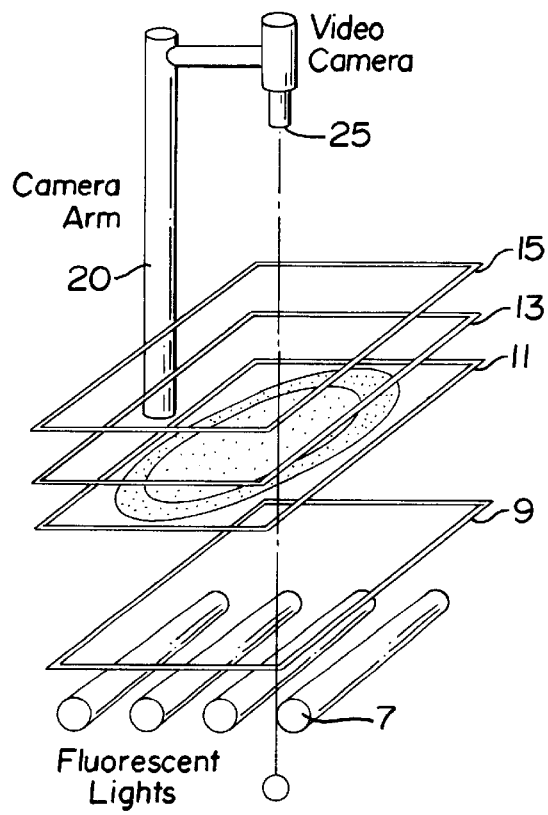
FIG. 2
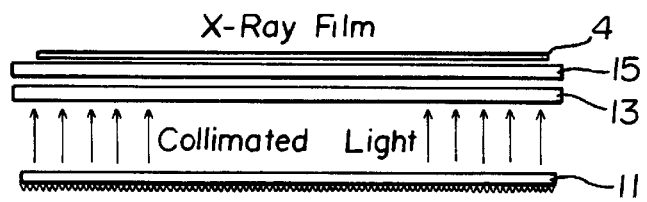
FIG. 3
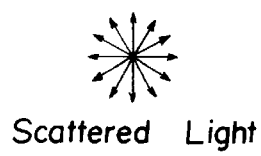

APPARATUS AND METHOD FOR COMPUTERIZED ACQUISITION OF X-RAY IMAGES

This is a continuation of application Ser. No. 08/497,231 filed on Jun. 30, 1995, now abandoned.

FIELD OF THE INVENTION

The invention relates to electronic imaging and more particularly to a method and apparatus for acquiring electronic images of extended gray-scale transparencies such as x-ray films.

BACKGROUND OF THE INVENTION

Certain prior art apparati have been developed to produce an electronically generated picture from a transparent film image. More specifically, certain apparati have been developed to reproduce an electronically generated image of those found in x-ray film transparencies with the capability of handling original film sizes up to 14"×17" typically found in full size radiographs. However, many of these apparati are based upon the slow and cumbersome process of line by line scanning of the film by various electronic means to digitize the image being scanned for subsequent electronic reproduction. These methods typically result in acquisition of a substantially degraded image with the length of time required for digitization making them impractical for commercial use. Examples of this approach will be apparent from U.S. Pat. Nos. 4,651,226, 4,943,689, 5,028,744, 4,958, 241, 5,282,064 and 5,337,164.

Further, the technology has not previously existed which would provide for the ability to electronically acquire an acceptable quality analogue image from x-ray films utilizing high speed full frame capture video input devices. Previous efforts utilizing standard radiograph backlit viewing panels have resulted in the acquisition of images of insufficient quality for use by medical clinicians. The natural occurring optical phenomena referred to as "light scatter" resulting in the acquisition of an image of poor contrast quality has most normally been attributed to this difficulty. Examples of an analogue approach to the conversion of film images into electronic format are shown in U.S. Pat. Nos. 5,321,681, 5,177,777, 4,035,067, 4,757,374, 4,387,985 and 5,276,534. Typically, these approaches require the use of complicated optics including large plano-convex ground lenses that add bulk and expense.

SUMMARY OF THE INVENTION

It is a general object of this invention to provide a novel and improved system and apparatus for the electronic acquisition of acceptable quality images from film transparencies.

It is another object of this invention to provide a novel system of optics designed to overcome the problems mentioned above including the problem of light scatter encountered in acquiring high quality x-ray images with regard to the dynamic gray scale content of the film when using a frame capture video camera for imaging input. The system thereby allows for the acquisition of the full range of optical density of the x-ray film.

Another object of this invention is to provide an easy to use, interactive process of electronic imaging whereby the image may be viewed on a continuously updated electronic display during the procedure, while also allowing for rapid film placement and orientation verification.

It is yet another object in a preferred embodiment of this invention to provide for the ability to zoom and focus rapidly on specific regions of interest in the film for extended resolution image acquisition.

Yet another object of a further preferred aspect of the present invention is to provide a process for the electronic acquisition of quality x-ray film images by computerized means including digitizing the film by placing the film either manually or mechanically on the apparatus within the optical path of the device for viewing and digital capture.

According to the present invention, then, there is provided apparatus for acquiring a video image from a film transparency, said apparatus having an optical axis O and a source of light for illuminating said transparency, comprising a first diffuser on said optical axis positioned adjacent said source of light, at least one fresnel lens positioned on said optical axis and having a focal length f, said fresnel lens being spaced from said first diffuser by a predetermined distance d where d<f, a second diffuser positioned on said optical axis adjacent said fresnel lens, transparent plate means for supporting said transparency on said optical axis and positioned adjacent said second diffuser, and recorder means positioned on said optical axis for acquiring a video image of said transparency.

BRIEF DESCRIPTION OF THE DRAWINGS

Preferred embodiments of the present invention will now be further described in greater detail and will be better understood when read in conjunction with the accompanying drawings in which:

FIG. 2 is a schematical perspective view of the optical components of the system of FIG. 1 detailing a preferred arrangement of component placement; and FIG. 3 is a side elevational diagrammatic view of the optical components of FIG. 2 in functional relationship.

DETAILED DESCRIPTION OF THE INVENTION

Figure 1:
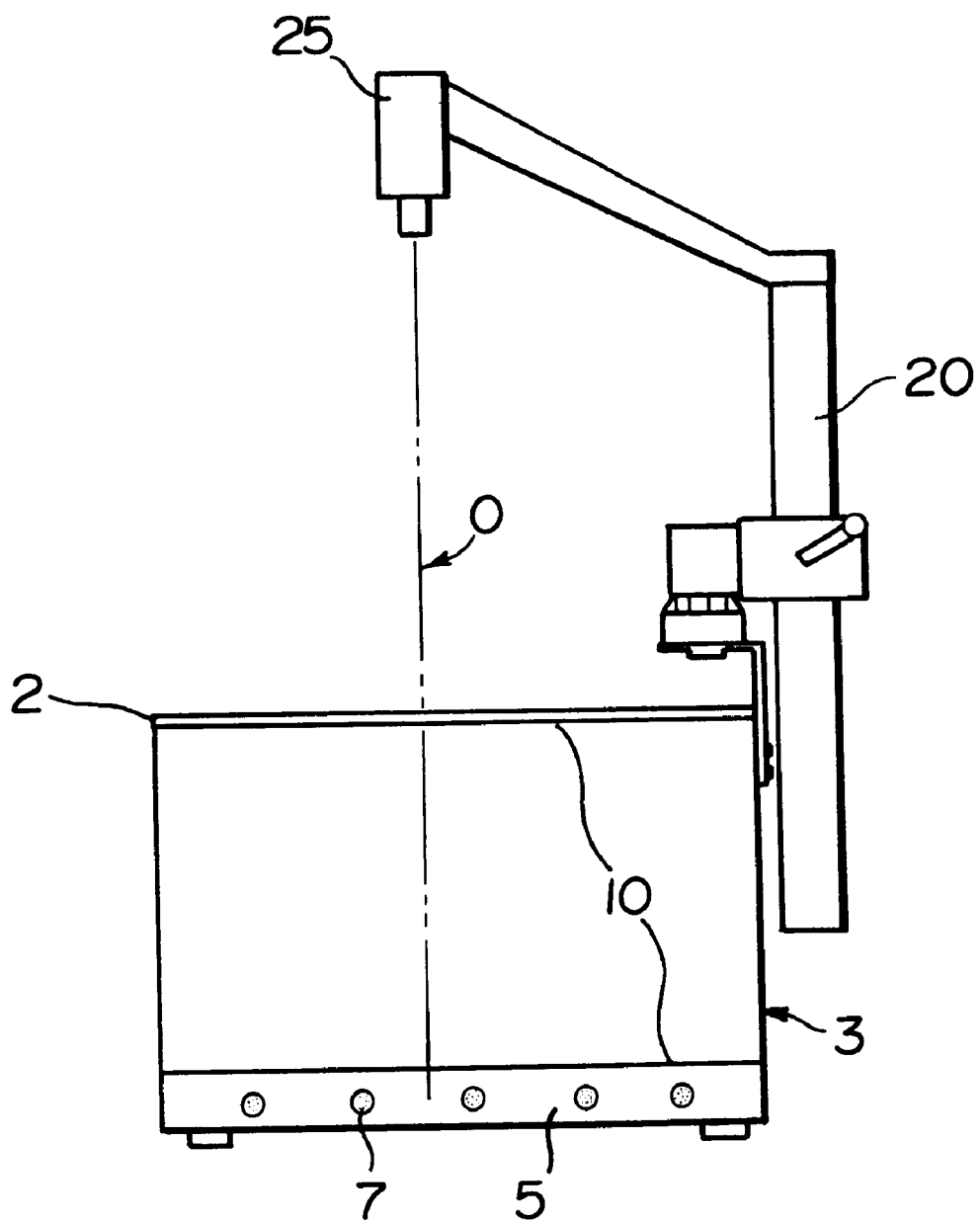
FIG. 1 is a schematical side elevational, partially sectional view of the film acquisition device of the present invention.

With reference to FIGS. 1 and 2, the present image acquisition device is generally centred about an optical axis O and comprises an enclosure 3 for a light source 5, optic components 10 and a variable height support arm 20 for an image recording device such as a video camera 25, the support arm 20 being conveniently connectable to enclosure 3.

Light source 5 preferably consists of multiple fluorescent tubes 7 of a low wattage output, preferably in the range of 15 to 20 watts each. Optics 10 comprise a first diffuser 9 mounted orthogonally to axis O above and adjacent to the light source 5 for initial scattering of the light from fluorescent tubes 7. At least one fresnel lens 11 is mounted, again orthogonally, to optical axis O at a distance d above diffuser panel 9 equal to the focal length of fresnel lens 11 (or combined fresnel lenses) minus approximately 10%. Thus, d≅0.9f.

A second diffuser panel 13 is mounted directly above fresnel lens(es) 11 ideally in contact or near contact with the lens(es) 11. Panel 13 is preferably approximately equal to fresnel lens(es) 11 in size and area. Directly above diffuser panel 13 and closely spaced to it is a ¼" thick tempered glass plate 15 preferably sized to fit within and be supported at the upper edge 2 of enclosure 3. Plate 15 supports the original transparency such as x-ray film 4.

As shown in FIG. 1, a variable height arm 20 is conveniently mounted to the back and top of the enclosure 3 for purposes of adjustably mounting a video input device 25 such as a video camera. Camera 25 ideally will have a variable focal length and a fixed or variable iris lens 27. Camera 25 may be focused on film 4 as a whole or on specific areas of interest in the film for capture and conversion into electronic format. The video image created by the camera can be further processed by computerized or other means for digitization of the signal which can then be stored, reproduced, displayed or otherwise dealt with an required by the user.

Referring to FIGS. 2 and 3, light rays 30 emanating from fluorescent tubes 7 intersect diffuser panel 9 above the tubes to provide diffused light adjacent the bottom of enclosure 3. The diffused and scattered light rays emanating from diffuser 9, along with reflected and scattered rays from the interior surfaces of enclosure 3, are refracted and collimated by fresnel lens(es) 11 so that the rays emerge parallel to optical axis O as best seen from FIG. 3. The collimated rays from the fresnel lens(es) 11 are then projected through second diffuser 13 and then through glass plate 15 to the abutting surface of film 4. The present system has been found to perform best with placement of second diffuser 13 directly on top of fresnel lens(es) 11 with the glass mounting plate 15 disposed directly on top of diffuser 13 so as to maintain transparency 4 in as close proximity as possible to diffuser 13. Lens 11 and diffuser 13 can be spaced apart along axis O but at a distance of even 4", for example, the optical results are likely to be quite poor.

In the result, collimation by fresnel lens(es) 11 produces a "clean" light source to the film, thus increasing contrast and eliminating problematic polarization caused by light scatter typically falling within the spectral range of sensitivity of the video input device.

In one embodiment constructed by the applicant, first and second diffusers 9 and 13 are 18"×24"×⅛" in size. Fresnel lens 11 is 16.5"×21"×¼" with a focal length of approximately 11.67". The distance d between lens 11 and diffuser 9 is 10.5". First diffuser 9 is spaced 2.5" above enclosure 3's lower surface and a total of five tubes 7 are spaced evenly apart beneath diffuser 9 starting at 2.75" from the enclosure's adjacent edge.

While the invention has been described with reference to one preferred embodiment, those stilled in the art will understand that modifications and alterations may be made without departing from the scope of the invention. Therefore, it is intended that the invention should not be limited by the foregoing description.

I claim:

1. An apparatus for acquiring a full frame generally full dynamic gray scale video image capture from an X-ray film transparency highly reactive to light-scatter, said apparatus having an optical axis and a source of light for illuminating said transparency with collimated light to generally eliminate light scatter within the film transparency highly reactive to light scatter, comprising:

a first diffuser on said optical axis positioned adjacent to said source of light;

at least one light collimating lens positioned on said optical axis and having a focal length f, said collimating lens being spaced from said first diffuser by a predetermined distance d where d>0 and d>f, said lens oriented as a converging lens to thereby reduce scattering of light passing through said lens and to collimate and direct said light orthogonally toward said transparency, parallel to said optical axis;

a second diffuser positioned on said optical axis adjacent to said collimating lens, said second diffuser being separated from said collimating lens by a predetermined distance;

a transparent plate means for supporting the X-ray film transparency highly reactive to light scatter on said optical axis and positioned adjacent to said second diffuser; and a video recorder means positioned on said optical axis for acquiring a generally full range optical density video image of said transparency.

2. The apparatus of claim 1 wherein said at least one light collimating lens comprises at least one fresnel lens.

3. The apparatus of claim 1 wherein said at least one fresnel lens and said second diffuser are in contact with one another.

4. The apparatus of claim 1 wherein said source of light comprises a plurality of florescent lights arranged in spaced apart relationship on a side of said first diffuser away from said transparency.

5. The apparatus of claim 1 wherein said transparent plate means and said second diffuser are layered together to be in contact or nearly in contact with one another.

6. The apparatus of claim 5 wherein said transparent plate means comprises a plate of tempered glass.

7. A method of acquiring a full frame video image capture from an X-ray film transparency highly reactive to light scatter supported orthogonally relative to an optical axis, the film transparency highly reactive to light scatter being illuminated by a source of light, comprising the steps of:

diffusing the light from said source thereof;

collimating said diffused light to align the rays of said light parallel to said optical axis and to reduce the scattering of said light;

directing the collimated light through an outer diffuser means to illuminate said transparency highly reactive to light scatter; and recording a generally full dynamic gray scale range optical density video image of said illuminated transparency highly reactive to scattered light.

8. The method of claim 7 wherein said light is collimated by at least one fresnel lens having a predetermined focal length f.

9. The method of claim 8 wherein said light from said source is diffused by a first diffuser means.

10. The method of claim 9 wherein the orthogonal distance d between said first diffuser means and said at least one fresnel lens is less than f.

11. The method of claim 10 wherein d≅0.9f.

12. The method of claim 11 wherein said at least one fresnel lens and said outer diffuser means are layered together to be in contact or nearly in contact with one another.

13. The method of claim 12 wherein the collimated light directed through said outer diffuser means is additionally directed through a transparent plate member adapted to support said film transparency thereon.

14. The method of claim 13 wherein said outer diffuser means and said transparent plate member are layered together to be in contact or nearly in contact with one another.

15. The method of claim 14 wherein said transparent plate member is a plate of tempered glass.

16. The method of claim 15 wherein said first diffuser means, said at least one fresnel lens, said outer diffuser means and said transparent plate member are arranged orthogonally to said optical axis.

* * * * *